United States Patent [19]
Gallap

[11] 3,809,357
[45] May 7, 1974

[54] MOLD FOR FORMING A LAMINATED PLASTIC PANEL

[75] Inventor: Francis Gallap, Van Nuys, Calif.

[73] Assignee: Exhibit Homes, Inc., Van Nuys, Calif.

[22] Filed: Apr. 23, 1970

[21] Appl. No.: 31,129

[52] U.S. Cl............... 249/161, 249/172, 425/409, 425/817 R, 425/110
[51] Int. Cl.......................................... B41b 11/56
[58] Field of Search .......... 249/160, 161, 163, 168, 249/169, 170, 172; 425/409, 408, 442, 450

[56] References Cited
UNITED STATES PATENTS

| | | | |
|---|---|---|---|
| 801,249 | 10/1905 | Keagy | 249/170 X |
| 3,171,163 | 3/1965 | Ford et al. | 249/170 |
| 1,368,231 | 2/1921 | Atwood | 425/409 |
| 738,476 | 9/1903 | Partridge | 249/161 X |
| 3,349,457 | 10/1967 | Frantz | 249/172 X |
| 3,602,949 | 9/1971 | Kaut | 249/170 X |

Primary Examiner—J. Spencer Overholser
Assistant Examiner—Dewalden W. Jones
Attorney, Agent, or Firm—Lyon & Lyon

[57] ABSTRACT

A building construction element having a central core of rigid plastic foam with each outer planar surface formed of a glasslike layer of hard plastic material. A method of forming a building construction element by locating a layer of foamable plastic material in the uncured state between thin films of uncured glass fibrous resinous material, confining the combined resinous films and plastic layer, permitting heat energy that is generated chemically within the resinous films to be transferred to the layer of plastic material causing such to foam and cure into a rigid material, permitting heat energy generated by the foaming procedure to be transferred to the resinous films causing such to become a solid glasslike material, bonding the glasslike resinous films to the layer of foamed plastic. A mold for producing sheetlike building construction elements employing first and second separable mold parts with the edge producing portion of the mold being movable with respect to the first and second mold parts.

7 Claims, 9 Drawing Figures

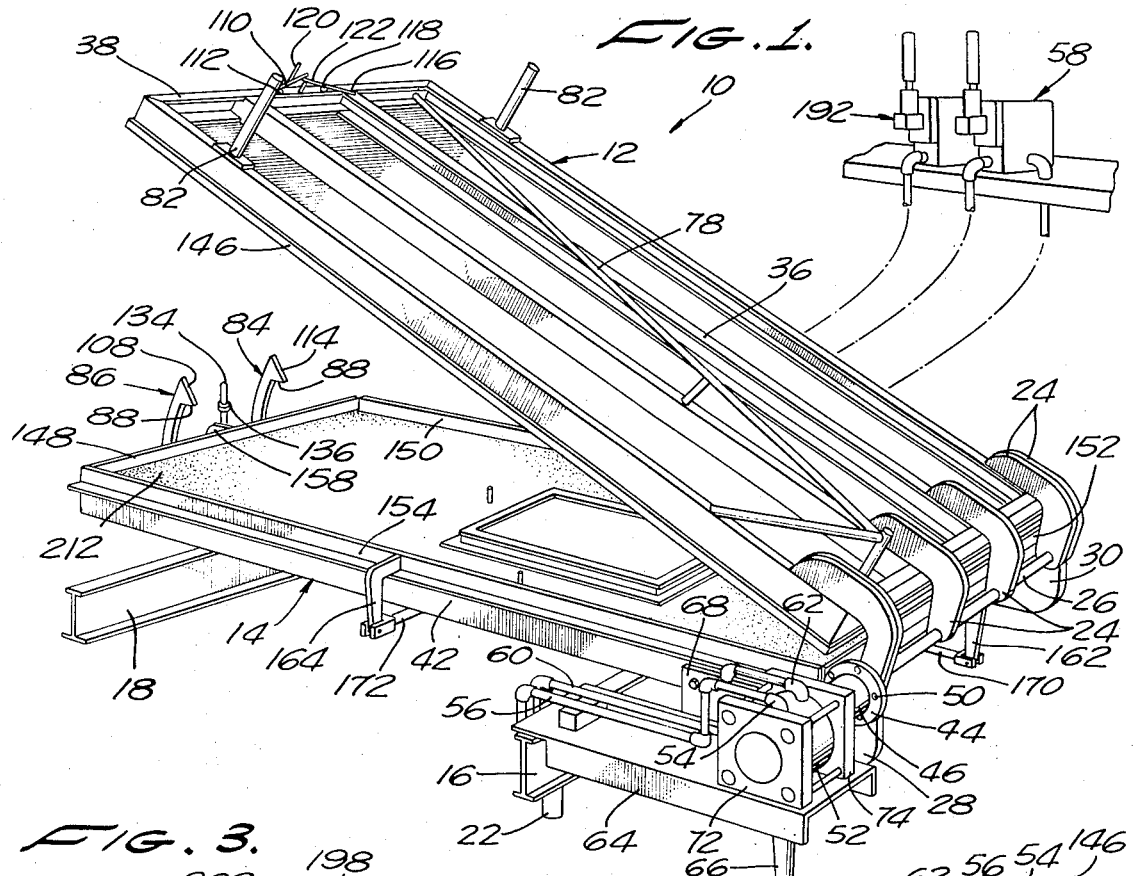
Fig. 1.
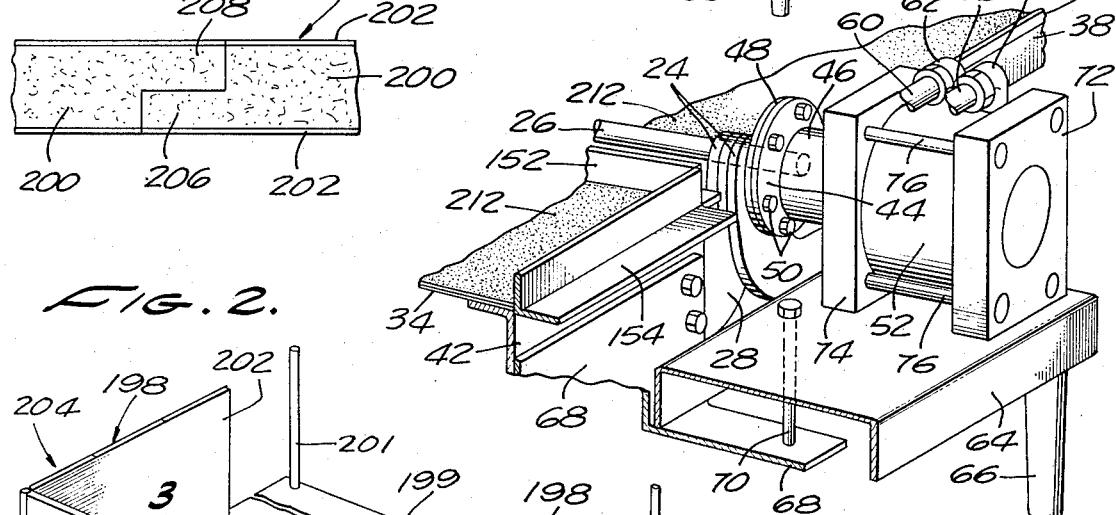
Fig. 3.
Fig. 4.
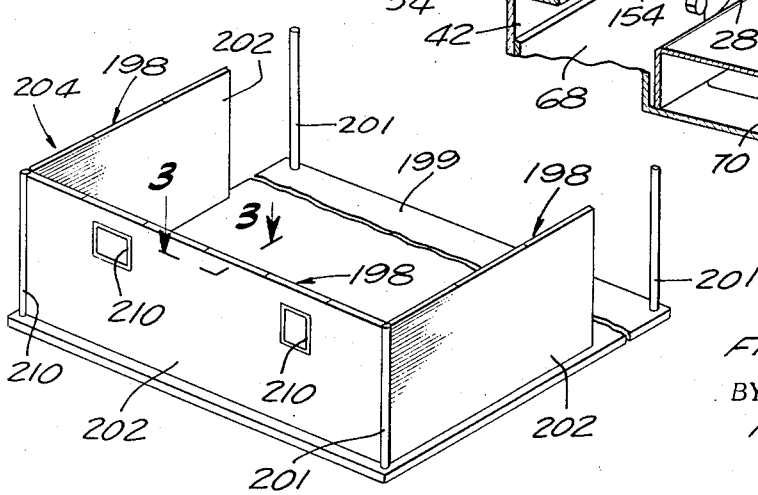
Fig. 2.
INVENTOR.
FRANCIS GALLAP
BY Herzig & Walsh
ATTORNEYS

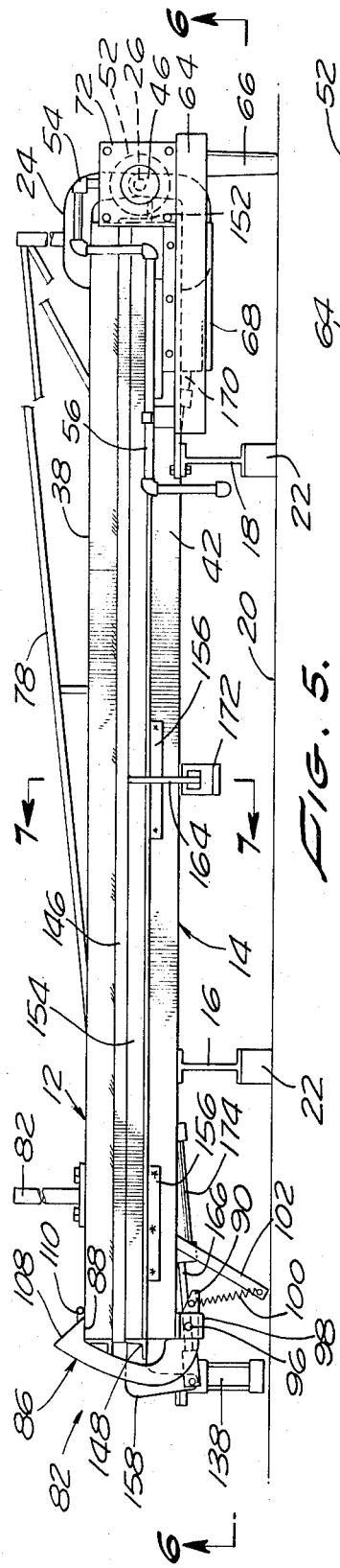
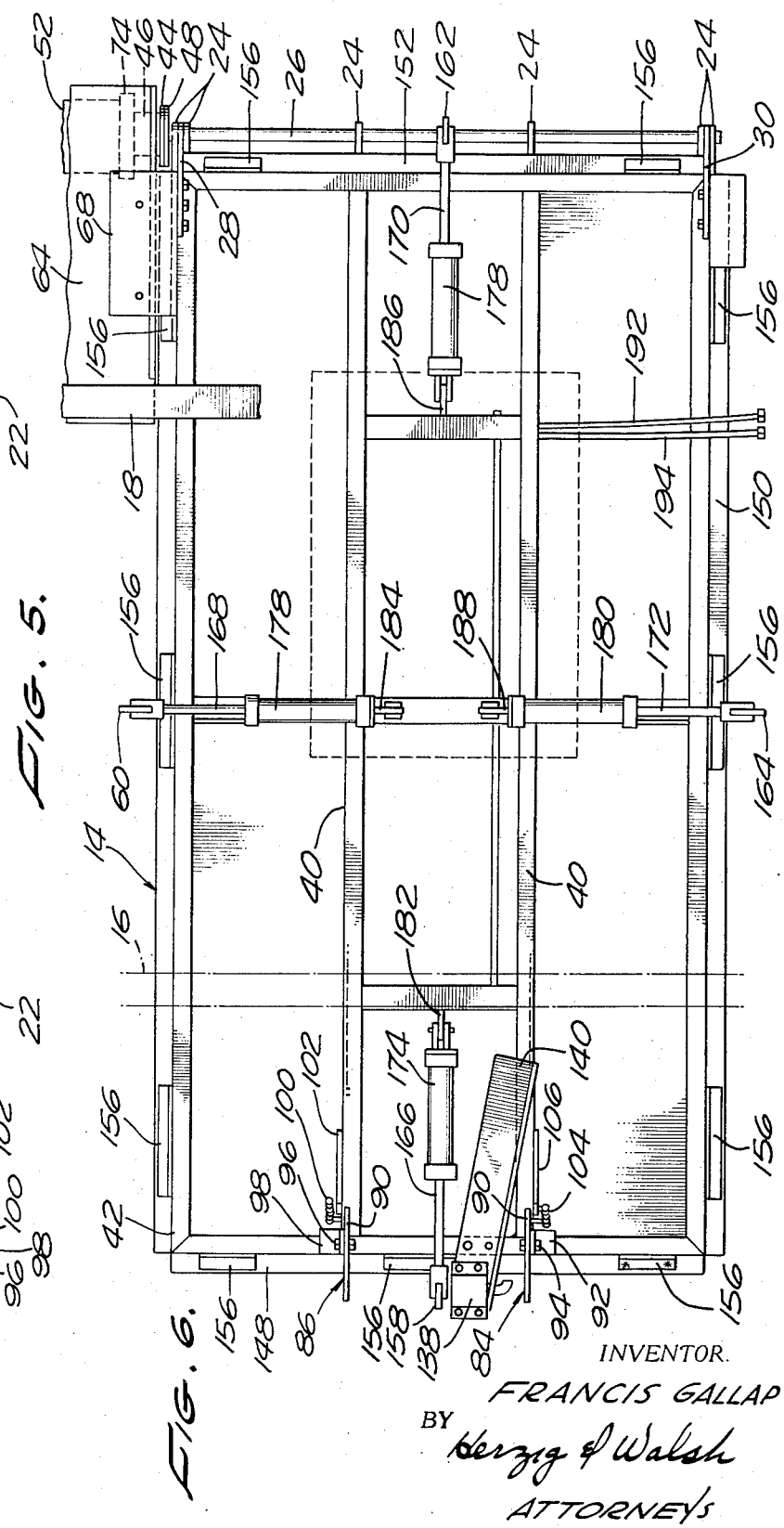

INVENTOR.
FRANCIS GALLAP
BY Herzig & Walsh
ATTORNEYS

MOLD FOR FORMING A LAMINATED PLASTIC PANEL

BACKGROUND OF THE INVENTION

The normal procedure for the construction of houses and buildings is to construct the structure from basic materials at the permanent site of the structure. Such construction, though satisfactory, is quite time consuming and therefore expensive. Due to the increase in the cost of land, materials and labor, it would be desirable to design some means of fabrication of houses and buildings at a lower cost.

One way it is known that the cost of housing can be reduced is by employing the use of prefabrication techniques. Prefabrication of houses and buildings is not in itself new as there have been many prefabricated structures marketed in recent years. Primarily, the prefabrication techniques were employed by designing a small number of house or building designs and constructing each of the structures in segments within a factory. The segments are then transported to the site of the structure for final assembly.

However, several disadvantages have been apparent with such type of prefabricated structures. One type of prefabricated structure was constructed of precut basic materials, with the housing segments assembled in forms within the factory for uniformity. Upon final assembly at the site, finishing touches were applied as plaster and painting. However, although expenses were diminished by such prefabrication, a significant part of the construction was accomplished at the site. The slight reduction of cost due to the prefabrication was not, by most homebuyers, believed to be worth the standardized appearance, the limited selection of models, and the inferior construction which was always apparent compared to the custom house.

It was finally decided by a few individuals that in order to achieve a major reduction of housing cost and building cost, the walls, floors and ceilings of the structure had to be completely prefabricated inside and out with no finishing being required. The first known type of such house was of metallic construction where the inner and outer wall surfaces had a baked on enamel paint finish similar to an automobile finish. However, such a house or building had many disadvantages. First, metal was an expensive material and seemed to be ever increasing in cost. Second, metal is a good heat energy conductor; therefore, much insulation was required to keep the cold out in winter and the heat out in summer. Third, people were not enthusiastic about living in small, standardized, metal houses.

With the advent of plastics, a new construction material was possible. Although plastic houses had been made apparent in designs for the future 20 or more years hence), no one to this date has been successful at designing and marketing a prefabricated plastic house. Plastic has many desirable qualities, a few of which are, light in weight, high strength to weight ratio, good insulator against both sound and moisture, can be textured differently and colored differently on opposing surfaces of a single panel, relatively inexpensive in the raw form as it is usually manufactured in the liquid state prior to curing. Heretofore, any structures which were designed of plastic panels were to be formed into a standard size of panel as a 4 by 8 foot panel. The panel was to be formed as a solid element with openings being cut within the panel for windows and doors. Electrical conduits and plumbing for the structure had to be located exteriorly of the panels which made such a structure undesirable. Also, the plastic wall panels were constructed of a standard size and from this standard size of panel the house design was devised, The inherent disadvantage of such structure design, is that all the structures are essentially similar inside and out, thereby the purchaser losing individuality.

It would be desirable to design a prefabricated weight supporting structural element, as a wall element and a floor element and a ceiling element, for permanent structures wherein the element was formed of plastic with great variance in the sizes of the element being available. Also, the element should include interiorly thereof electrical conduits and plumbing thereby hiding such from view.

SUMMARY OF THE INVENTION

The building construction element of this invention is formed of a laminated construction of a central core being composed of a rigid plastic foam with the outer, planar surfaces thereof formed of a fibrous, glasslike layer of substantially hard plastic material. The building construction element is formed by applying a thin film of an uncured glass fiber, resinous material to one side of a separable mold. A layer of uncured foamable plastic material is then applied upon the uncured resinous material. A thin film of the uncured resinous material is also applied to the second side of the mold surface. Within the mold are to be located any electrical conduits or plumbing which are desired to be included within the construction element. Also, any openings as for doors or windows are to be positioned where desired within the mold through the use of forms, with the foamable material not being applied within the interior of the forms. The mold is then closed with the result of the foamable material chemically reacting with the resinous material resulting in expansion thereof and completely filling of the mold. Expansion of the foamable material surrounds the conduits and plumbing resulting in an integral formation of such within the structural element. The heat energy created within the foamable material during the expansion and curing procedure is transferred to the resinous material resulting in curing thereof to a hard glasslike material. The foamable material becomes substantially rigid resulting in the formation of a substantially strong structural element. In the construction of a house or a building a plurality of the structural elements are to be connected together as with an adhesive to form segments of the structure as wall, ceiling and floors.

The process for the forming of the above defined structural element of this invention would include the placing of door and window forms in the desired area of location within a separable mold. The surfaces of the separable mold are then sprayed, except for the area located within the door and window forms, with a thin film of glass fiber, resinous material. Then, within the mold electrical conduits and the plumbing conduits would be located, positioned as desired. Such conduits would in most instances be spaced adjacent the midpoint of the thickness of the construction element by means of a series of small pegs or other aligning means. Applied to the surface of the mold, upon which have been located the conduits, is the foamable plastic material as, for example, a polyurethane plastic. The mold is then closed resulting in complete confining of the to be formed structural element. The chemical reaction of the foamable material is then effected causing expansion of the foamable material filling the confines of the mold and also the heat energy of such exansion being transferred to the resinous material causing curing thereof. Upon complete curing of the structural element, the element is then removed from the mold making such ready for use.

The mold for producing structural elements of this invention employs the use of first and second separable mold parts for forming the opposing surfaces of the formed structural element. The second mold part is pivoted at one edge thereof with respect to the first mold part to effect separation of the mold parts. At the end of the mold parts opposite the hinged connection, a latching device is located to securely retain the mold parts together during the molding procedure. A plurality of edge members for forming the edge of the panel are located in between the first and second mold parts during molding adjacent the periphery of the first and second mold parts. The edge elements are pivotally connected by means of hinges with respect to the first mold part. Means are provided to effect pivotal movement of the edge elements in a direction away from the first mold part. Such pivoting and resulting removal of the edge elements from the edge of the construction element facilitates the removal of the element after formation. At such a time as the construction element is completely cured within the mold and it is desired to open the mold, the latching mechanism is moved to the unlocked position and a hydraulic ram is activated to initaily open the mold and break the created adhesive seal of the finished product against the surfaces of the mold. The mold parts, in order to not deflect during the expansion procedure of the foamable plastic, are formed to be substantially strong and may also include venting openings to relieve excess pressure. Also, the mold parts may include a heating means for speeding up the curing process and a cooling means for decreasing the temperature of the cured construction element thereby facilitating handling thereof.

BRIEF DESCRIPTION OF THE DRAWINGS

FIG. 1 is a perspective view of the mold of this invention shown in the partially open position;

FIG. 2 is a fragmentary, perspective view of a typical building construction employing the construction element formed by this invention;

FIG. 3 is a view of the joint between the adjacent elements shown in FIG. 2 taken along line 3—3 of FIG. 2;

FIG. 4 is a perspective view of the actuator means to effect opening of the mold shown in FIG. 1;

FIG. 5 is a side view of the mold shown in FIG. 1 but showing the mold in the closed position;

FIG. 6 is a bottom view of the mold of this invention taken along line 6—6 of FIG. 5;

DESCRIPTION OF THE PREFERRED EMBODIMENTS

Figure 7:
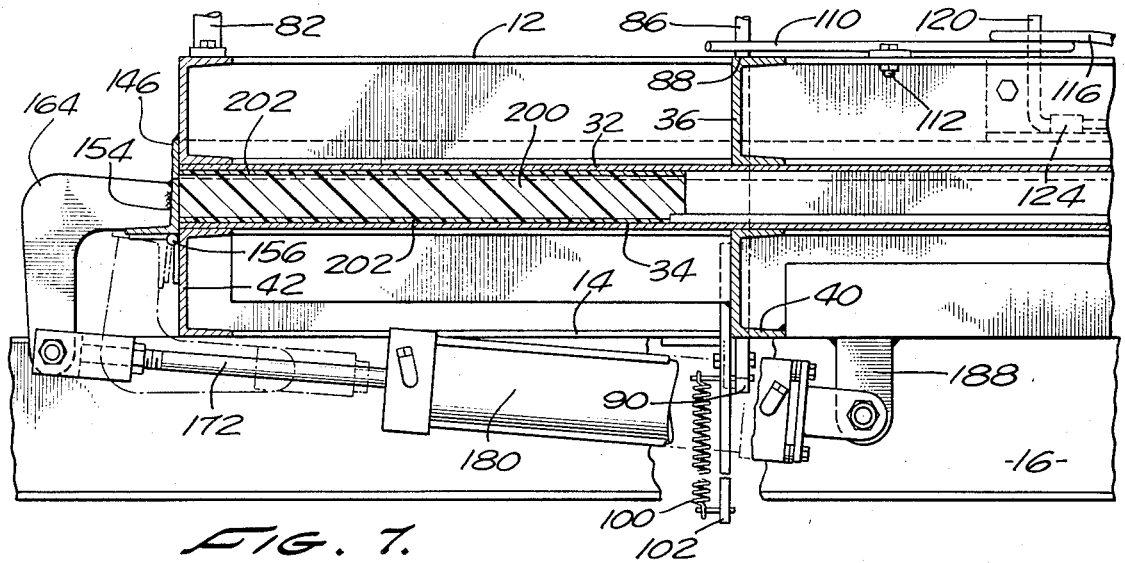
FIG. 7 is a partly-in-section view taken along line 7—7 of FIG. 6 showing in more detail the actuating means to effect pivoting of an edge of the mold.
Figure 8:
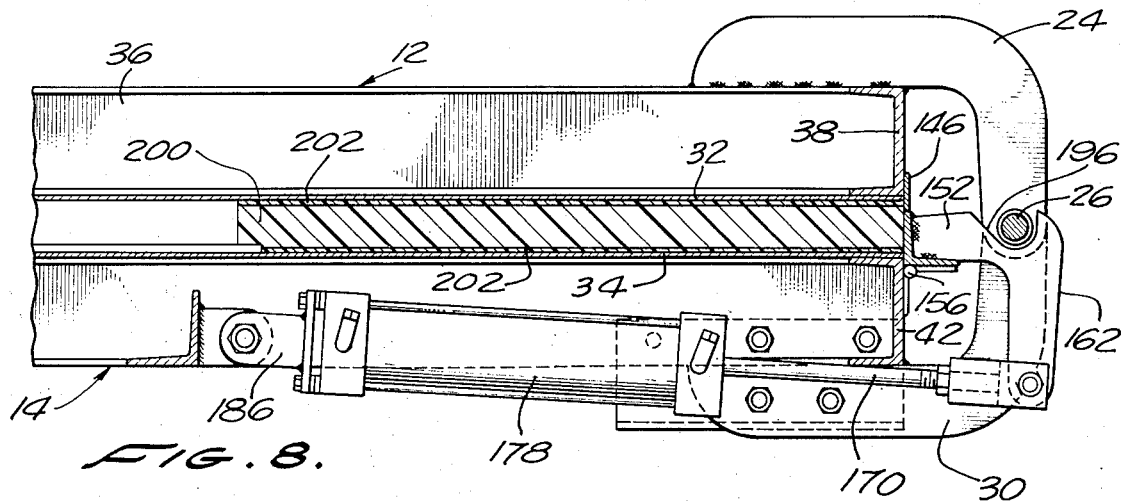
FIG. 8 is a partly-in-section view showing in more detail the actuation means to effect pivoting of the edge of the mold to open the mold.

Referring particularly to the drawings, there is shown in FIG. 1, a mold 10 having a first mold part 12 and a second mold part 14. The lower surface of the second mold part 14 is shown resting upon front I-beam 16 and the aft I-beam 18. It is to be understood that the manner for supporting the mold 10 is strictly a matter of choice or design, with the employment of the dual I-beams 16 and 18 being merely representative of a particular manner of satisfactory support. I-beams 16 and 18 are separated from floor 20 by means of a plurality of shock mounts 22.

Attached to the aft end of the first mold part 12 are a plurality of first hinge parts 24. Each of the first hinge parts 24 are fixedly secured, as by welding, to a shaft 26. It is to be noted that on each side of the first mold part 12, two hinge parts 24 are located adjacent one another. Such dual hinge arrangement is due to the fact that upon opening of the mold 10, such locations would be the areas of greatest stress concentration. Shaft 26 is rotatably mounted upon brackets 28 and 30 which are fixedly secured to the second mold part 14. Bracket 28 is located adjacent one side of the second mold 14 with bracket 30 being located adjacent the opposite side of second mold part 14. It is to be noted that the length of the first hinge parts 24 with respect to the length of the brackets 28 and 30 determines the spacing between the first mold part 12 and the second mold part 14 when in the closed position. As the first hinge parts 24 are fixedly secured as by welding to the first mold part 12, variation in the spacing can be achieved by removing brackets 28 and 30 (as they are attached by bolts to the second mold part 14), and substitution thereof by either longer or shorter brackets as desired.

The first mold part has an inner mold surface 32 with the second mold part 14 having an inner mold surface 34. Mold surfaces 32 and 34 are shown to be substantially planar in configuration within the rectangular design of the first and second mold part 12 and 14. The mold surfaces are also shown to be substantially smooth. It is to be understood to be within the scope of this invention that, if it is desired to form decorative surfaces upon the molded element, that the mold surfaces 32 and 34 may be textured or otherwise so formed. As for example, the mold surfaces could be formed to produce simulated brick, simulated stucco or other forms of simulated material. Located on the back side of the inner mold surface 32 are a plurality (two in number being shown) of trusses 36 being retained in position by outer frame 38 of the first mold part 12. Trusses 36 are to maintain the inner mold surface 32 perfectly planar and not deforming during the molding operation. In a similar manner trusses 40 are attached to outer frame 42 of the second mold part 14 to maintain the inner mold surface 34 in a non-deformable manner during molding.

To further insure maintaining the inner mold surface 32 perfectly planar against deforming during the molding operation, a brace 78 is diagonally positioned across the first mold part 12 and is permanently attached, as by welding, to outer frame 38 and both the truss members 36.

To effect rotation of shaft 26, shaft 26 is connected through flange 44 to a motor shaft 46. A flange 48 is attached to shaft 26 to cooperate with flange 44 in a fixedly secured manner as by bolts 50. A motor (not shown) is to be located within motor housing 52 to cause rotation of motor shaft 46. Fitting 54, through conduit 56, is to supply hydraulic fluid from valve 58 from a source (not shown) to operate the motor to rotate motor shaft 46 and effect opening of the mold 10. Hydraulic fluid may also be conducted, by selective arrangement of valve 58, into conduit 60 through fitting 62 to rotate the motor and motor shaft 46 in the opposite direction effecting closing of the mold 10.

Motor housing 52 is to be mounted upon a table 64 which is attached at one end thereof to I-beam 16 and supported upon floor 20 by leg 66 at the other end. Table 64 is also attached to plate 68 by means of bolt 70, with plate 68 being fixed to outer frame 42. Motor housing 52 is closed at each end thereof by means of front plate 72 and aft plate 74. Connecting bolts 76 function to secure the front plate 72 to the aft plate 74 with the motor housing 52 located therebetween.

With the mold in the fully open position, legs 80 are attached to the outer frame 38 of the first mold part 12 to support such upon floor 20. With the mold 10 in the closed position, a latching mechanism 82 is to retain the first mold part 12 to the second mold part 14. Latching mechanism 82 includes a first latching pawl 84 and a second latching pawl 86. Each of the latching pawls 84 and 86 are substantially identical in construction with each having a latching portion 88 and a pivotal portion 90. First latching pawl 84 is pivotally secured to plate 92 by means of pivot pin 94 with plate 92 being fixedly secured to outer frame 42 of the second mold aprt 14. In a similar manner second latching pawl 86 is attached to frame 42 by pivot pin 96 and plate 98. Pivotal portion 90 is connected to a spring 100 which is secured to an extension 102 which is fixed to frame 42. Spring 100 is to place a constant bias upon latching pawl 86 tending to move such toward the latched position. In a similar manner a spring 104 is attached to an extension 106 to likewise move latching pawl 84 toward the latched position.

The camming surface 108 of the second latching pawl 86 is contacted by a rod 110 which is attached at its approximate mid-point to the frame 38 of the first mold part 12. The attachment of rod 110 is by a bolt 112 which permits pivotal action of rod 110 with respect to frame 38. In a similar manner camming surface 114 of the first latching pawl 84 is contacted by a rod 116 which is also pivotally attached by a bolt 118 at its approximate mid-point to frame 38. The free ends of rods 112 and 116 are to each contact actuator rod 120 with the latching pawls 84 and 86 in the latching position. With the latching pawls 84 and 86 in the unlatched position, excessive pivotal movement of the rods 110 and 116 in the opposite direction is prevented by means of stop pin 122.

Actuator rod 120 is substantially L-shaped in configuration with the leg of the L being rotatably supported within trunnions 124 and 126. Trunnions 124 and 126 are fixed within a horizontal portion of an attaching plate 128 with the vertical portion of plate 128 being securely fixed to frame 38 as by bolts 130. Integrally attached to actuator rod 120 in between trunnions 124 and 126 is a tongue 132. Tongue 132 is to be contactable on the underneath side by the end of actuator shaft 134 which cooperates with an opening in plate 128 (not shown). A stop nut 136 is to be threadingly secured to shaft 134, the function of which will be described further on in the specification.

Actuator shaft 134 is movable by an actuator 138 of the hydraulic type with the actuator 138 being fixedly positioned with respect to frame 42 by means of attaching plate 140. Hydraulic pressure is to be supplied to actuator 138 through conduit 142 to move actuator 138 to effect movement of latching pawls 84 and 86 to the unlatched position. As it is necessary to actuate the latching mechanism to the unlatched position upon opening of the mold 10, conduit 142 is connected to conduit 56 (the connection not shown) which supplies the hydraulic pressure to the motor to effect opening of the mold 10. When it is desired to close the mold 10, the hydraulic pressure that is being supplied into conduit 60 is also transmitted through a connecting conduit 144 to move actuator 138 to permit the latching pawls to move into the latched position due to the biasing action of springs 100 and 104. Upon the first mold part 12 moving into the closed position, the forward edge of the part 112 will contact camming surfaces 108 and 114 thereby moving the latching pawls 84 and 86 toward the unlatched position until the latching portions 88 can cooperate with the upper portion of frame 38 as shown in FIG. 5 of the drawings. If it is desired as previously stated to vary the spacing between the first mold part 12 and the second mold part 14 as to increase or decrease the depth of the molding chamber, not only would it be necessary to employ different length brackets 28 and 30, but different length latching pawls 84 and 86 would also be employed to correspond to the bracket length 28 and 30.

The operation of the latching mechanism included within this invention is as follows: To move the latching mechanism 82 to the unlatched position, actuator 136 is moved longitudinally due to hydraulic fluid being supplied through conduit 142 into the lower portion of the actuator 138. The actuator shaft 134, by being in contact with tongue 132, causes rotation of actuator rod 120 toward frame 138. As a result, rod 110 is pivoted moving latching pawl 86 away from cooperation with frame 38. In a similar manner rod 116 moves latching pawl 84 out of cooperation with frame 38. Because of the tendency of the molded part to stick to the molding surfaces 32 and 34, it is desirable to employ some means to break such adhesive characteristics. For this reason, with the latching mechanism 82 in the unlatched position, stop nut 136 is adjusted to contact the lower surface of plate 128. An additional movement of actuator shaft 134 is permitted of approximately an inch which initiates the separation of first molding part 12 from the second molding part 14. This small amount of separating movement eliminates the placing of substantial torque upon the opening shaft 26.

Figure 9:
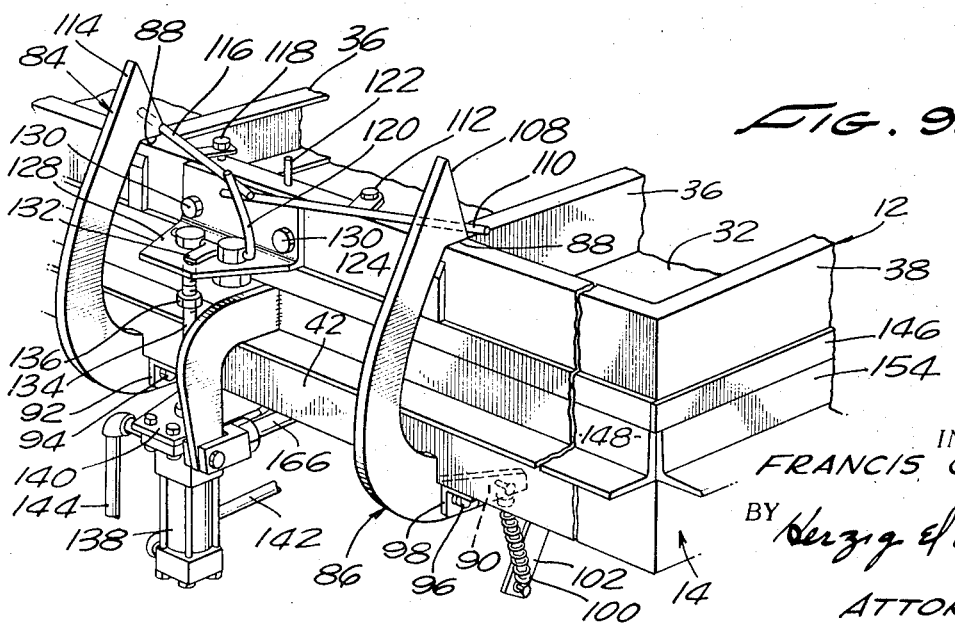
FIG. 9 is a perspective view of the latching mechanism to retain the mold in the closed position.

When it is desired to close the mold, the hydraulic fluid within conduit 60, to effect the closing movement upon shaft 26, is also conducted into conduit 144 which moves actuator rod 134 such as to space stop nut 136 from plate 128 as shown in FIG. 9 of the drawings. As a result, tongue 132 again comes into contact with the upper surface of plate 128 with rod 120 pivoting away from frame 38. Therefore, rods 110 and 116 pivot permitting latching pawls 84 and 86 to again cooperate with frame 38 upon the mold being completely closed.

Surrounding the inner molding surface 32 and being attached to frame 38 is a flange 146. Edge elements 148, 150, 152 and 154 are to be located in an abutting relationship with flange 146. Each of the edge elements 148 through 154 are pivotally connected by hinges 156 to outer frame 42. Each of the edge elements is in the shape of an L-shaped bracket with the hinge connection being established adjacent the apex portion of each edge element. Each of the edge elements are to be located with respect to each other so that with the mold 10 in the closed position the first mold part 12 is equidistantly displaced from the second mold part 14. It is also to be understood as previously mentioned, if it is desired to vary the depth of the molding chamber, the edge elements would also have to be changed as well as brackets 28 and 30 and latching pawls 84 and 86.

An arm 158 is permanently attached to edge element 148 with arm 160 being attached to edge element 150, with arm 162 being attached to edge element 152, and with arm 164 being attached to edge element 154. An actuator rod 166 is pivotally connected to arm 158, with actuator rod 168 being pivotally connected to arm 160, with actuator rod 170 being pivotally connected to arm 162, and with actuator rod 172 being pivotally connected to arm 164. Actuator rod 166 is movable by hydraulic actuator 174, with actuator rod 168 being similarly movable by hydraulic actuator 176, with actuator rod 170 being similarly movable by actuator 178, and actuator rod 172 being movable by hydraulic actuator 180. Each of the actuators 174, 176, 178 and 180 are pivotable by their respective bearing plates 182, 184, 186 and 188. Each of the bearing plates 182, 184, 186 and 188 are fixedly secured to a portion of the fixed structure of the second mold part 14.

It is to be noted that arm 162 is notched at 196 to avoid interference of arm 162 with shaft 26 when the edge element 152 is in cooperation with flange 146.

Hydraulic pressure is to be supplied (from a source not shown) through the actuating valve 190 into appropriate conduit structure 192 simultaneously to each of the hydraulic actuators 174, 176, 178 and 180. Actuation of valve 190 may selectively cause hydraulic fluid to be conducted into conduit structure 194 and similarly to hydraulic actuators 174, 176, 178 and 180. Hydraulic fluid being supplied to conduit structure 192 causes actuators 174 through 180 to cause extension of their respective actuator rods 166 through 172. As a result, each of their respective edge elements 148 through 154 is pivoted to be located in an abutting relationship with flange 146 resulting in accurate spacing of the first mold part 12 from the second mold part 14, and complete confining of the molding chamber. Upon the supplying of hydraulic pressure through conduit structure 194 the actuator rods 166 through 172 are contracted causing pivotal movement of their respective edge elements 148 through 154 to a position where a portion of each edge element comes into contact with frame 42. Again, because of the tendency of the molded structure to adhere to the molding surfaces, by pivoting each of the edge elements away from the completely molded structure, removal of such is facilitated.

It is believed by applicant that although the molding apparatus of this invention has been completely described, both as to the elements and as to the operation of the foregoing, numerous modifications or changes may be employed without departing from the scope of the invention. As for example, a material of construction of the mold 10 may be any substantially hard material such as steel. However, it is applicant's belief that a lighter material such as aluminum would be more desirable especially since aluminum appears to have less adhesive qualities with respect to the molded element. Less adhesive qualities thereby will permit release of the molded product easier than other metals or pressed wood products. It is also envisioned by applicant that in order to increase production of the molded elements, inclusion of a heating means to increase the rate of curing may be desirable. Also, upon complete curing of the molded elements, it may be desirable to include cooling structure to bring the temperature of the molded element to a safe level to facilitate safe handling. Further, the mold 10 of this invention must be formed sufficiently strong in order to not deform under the pressure of expansion of the molded element. For this reason the latching apparatus 82 as well as the pivotal connection through shaft 26 has been designed to be able to withstand the pressures generated within the mold 10. It may also be desirable to include some form of venting means within the molding chamber to release pressure due to expansion upon reaching an undesirable level. Further, as previously referred to, it is the intention of applicant in some instances to form the molding surfaces 32 and 34 to produce decorative type of surfaces. As for example, types of decorative surfaces which can be readily produced are simulated brick, stone and siding, veneers, wood paneling and a variety of textures from simulated wall paper type effect to leather, marble, etc. It is also envisioned by applicant that a given molded element on one side thereof may have a different texture than the opposite side of the molded element. The front portion of the building might have a siding effect or masonary with the living room having a texture similar to plaster. The kitchen would more than likely have a smooth surface. It is even envisioned to simulate wood shakes or shingles or other decorative roof items.

Referring particularly to FIGS. 2 and 3 of the drawings, to form the building construction element 198 of this invention from the mold 10 of this invention is as follows: The completely cured element 198 is to be formed of a rigid core 200 with thin exterior surface films 202. It has been found that a satisfactory type of material for the rigid core would comprise a foamable polyurethane plastic. It has also been found satisfactory to employ a glass fiber resinous composition for the films 202. It is the intention of applicant to employ a series of interlocking joints within each of the completely cured construction elements to facilitate attachment together to form the walls of the building 204. As shown in FIG. 3 of the drawings, the vertical edges of the cooperating construction elements 198 cooperate together with complementary flanges 206 and 208. It is applicant's intention tyhat any of several forms of cooperating connections could be employed such as keyways, dovetailing, rabetting, the use of dowels, etc. Further, applicant does not anticipate connecting the elements 198 together by means of conventional fasteners such as bolts and screws. It is applicant's intention to use some form of an adhesive such as a polyester or epoxy liquid adhesive and the members 198 will be secured together by application of such adhesive to the selected cooperation means. The elements 198 are to be supported upon a floor 199 of the building 204. Extending upwardly from floor 199 at each corner thereof are posts 201. The elements 198 are to abut posts 201 and be adhesively secured thereto. The posts are to be formed of steel or other similar construction material, it only being required that such material be substantially rigid and weight supporting.

It is to be considered within applicant's invention to employ different types of materials for the material of construction of the elements 198. As for example, it is envisioned that instead of the film 202 being composed of glass fiber, resinous material, a more dense urethane material may be employed. Also, any other type of material which can be chemically formed may be employed. The main qualities desirable of any such material is for the material to be substantially unaffected by the elements such as the ultra-violet waves of sunlight and moisture. Also, such material should have a high compressive and tensile strength, the strength of the exterior films to be sufficiently hard to resist marring or damage thereto, and for the material to be substantially fire retardant. It is also envisioned that the mold 10 will be designed to be of a length to permit the forming of any reasonable sized panel and not being restricted to panels of a standard size such as 4 by 8 foot. It is envisioned that the same mold could be able to produce panels of any length up to forty feet.

To form each of the elements 198 of this invention is to be accomplished by the following method: If it is desirable that the ultimately produced element 198 shall include apertures as for doors or windows, a fitting 210 may be located upon molding surface 34 in the desired location to prevent forming of the element 198 in that area. Fitting 210 may take the form of a removable member after complete curing and removal of the element 198 from the mold 10, or it may be permanent requiring only the installation of glass for a window or the installation of a door. Also, it is envisioned that the elements 198 will include plumbing and electrical conduits within each element 198. The plumbing or electrical conduits will be located in the desired position upon molding surface 34 and spaced from surface 34 approximately centrally of the thickness of the resultantly formed element by means of pegs extending from the molding surface 34.

With the fittings 210 having been located as desired upon molding surface 34, the form surface 34 is then sprayed with a liquid uncured film 212 as, for example, a glass fiber resinous material, the only requirement for such material 212 being that curing is effected through the application of heat energy. Both the molding surfaces 34 and 32 are to be sprayed with the uncured film material 212. Upon the uncured material 212 being located upon molding surface 34, a layer of foamable plastic material such as polyurethane plastic will be applied. The foamable plastic material is not applied in the area interiorly of the fittings 210, but is applied about any conduits. The thickness of both the films 212 and the layer of uncured foamable plastic are in the thicknesses of a few thousandth of an inch in most cases. The mold is then closed resulting in complete confining of the uncured material. At normal room temperature, with the use of a catalytic agent in the uncured resin films 212, the chemical reaction occurs with heat energy being generated. The heat energy is then transferred to the foamable plastic which begins to expand resulting in filling up the entire space between the resin films 212. Expansion of the foamable plastic also generates heat energy which is transferred to the resin films to facilitate the curing thereof. The foamable plastic 200 in the final configuration becomes a substantially rigid material with the films 202 forming a very hard, durable and damage resistant surface. During the expansion of the foamable plastic, an extremely strong integral bond occurs between the foamable plastic and the resin films. As previously indicated, it may be desirable to supply heat energy from an outside source to facilitate the foregoing reactions and upon completion of such reactions the supplying of a cooling medium to bring the completed element 198 down to a reasonable temperature to facilitate handling. An additional step in the foregoing method may be to provide a pigmentation within the uncured resinous material thereby resulting in elements 198 of specific colors.

It is applicant's belief that to facilitate mass production of elements 198, no doubt the spray nozzle apparatus to facilitate the applying of films 212 and the foamable plastic, will be located upon an overhead track arrangement or the like. With such a system the nozzles could be automatically employed to apply the uncured material upon the mold surfaces with the quantity and distribution being uniform.

After the panels have been formed the elements which are very light in weight, are transported to the site with erection of the building taking place. Erection can be by way of relatively unskilled personnel. The elements are erected including both outside and interior walls with adjacent edges of the elements being bonded together with an adhesive with the edges thereof cooperating together as previously stated. It is envisioned that the adhesive will be applied as simply as painting or by spraying.

A method of connecting together the conduits which have been integrally formed within the foamable material has been devised. However, it is a method of connection of substantial description and it is believed not to be necessary to describe such here within this application.

It is also envisioned that not only in addition to the fabrication of walls for buildings, it is intended to fabricate the ceilings and floor elements. It is to be understood that where generally walls will comprise planar surfaces, the floors and ceilings, in order to support weights and span distances, will have a beam type of construction or other similar construction.

What is claimed as new in support of Letters Patent is:

1. A mold for forming a building element having at least two outer skins and an inner foam, wherein said outer skins are formed by curing a thin film of a fluid, resinous material and the inner foam is formed from an expansion process which takes place after said thin film has been applied to the mold surfaces of said mold and said mold is in a closed position, said mold comprising:

a first, generally horizontal mold surface;
a second mold surface hingedly attached near said first mold surface, said attachment being such as to permit said second mold surface to be moved from an upwardly-facing, generally-horizontal, open position to a downwardly-facing, closed position about parallel to said first mold surface said first and second mold surfaces forming major surface areas of the mold;
side elements attached along each side of said mold and movable so as to form a closed cavity when said second mold surface is in its closed position and so as to be capable of being pivoted away from the mold to provide substantially unobstructed access to said major mold surfaces; and means for moving said second mold surface between its open and closed position, said means comprising a motor attached at the pivotal axis of said second mold surface to rotate said second mold surface substantially 180° relative to said first mold surface.

2. An apparatus as defined in claim 1, wherein:
said means includes a hydraulic actuator.

3. An apparatus as defined in claim 1, wherein:
said molding chamber is rectangular in configuration and has four of said elements about said molding chamber;
wherein said second part is hingedly movable with respect to said first part; and
each of said elements are hingedly attached to said first part, and have hydraulic actuation means to effect movement of each element about its respective hinge connection.

4. The mold of claim 1 further including means for moving said side elements from an open position to a closed position.

5. The mold of claim 1 wherein said side elements are attached along each side of said first mold surface.

6. A mold apparatus for accommodating a process of forming a rectangular laminated plastic panel involving the curing of a fluid, resinous outer layer and the expansion of an inner foam comprising:
a first mold member including a horizontal rectangular first mold surface and first structural support members extending across the back side of said first mold member to maintain said first mold surface flat under the pressure of the expanding foam;

a second mold member including a rectangular second mold surface and second structural support members extending across the back side of said second mold member to maintain said second mold surface flat under the pressure of the expanding foam;

a shaft adjacent one end of each of said mold surfaces, said shaft being pivotally mounted to said first mold member and said shaft being fixed to said second mold member;

means to rotate said shaft and thereby move said second mold surface from an upwardly-facing horizontal open position adapted to receive the fluid resin to a downwardly-facing horizontal closed position adjacent and parallel to said first mold member;

lock means for holding said mold members together to resist the pressure of the expanding foam, said lock means being operably connected to one of said mold members and being adapted to receive the other of said mold members at the end of said mold members from said shaft when the mold members are closed;

a rectangular side element pivotally connected to each side of one of said mold members and extending the length of and adjacent to an edge of said molding surface, each said side element being substantially narrower than one of said mold surfaces; and means to move said side elements from a vertical position between said parallel mold surfaces when said second mold surface is in the closed position to contain the foam during the expansion of the foam to an outwardly expanding open position to accommodate the release of the panel.

7. The device of claim 6 wherein said second mold member includes hinge members rigidly fixed to said shaft, said hinge members being placed close together near either end of said shaft to resist stress concentrations near the sides of said mold apparatus.

* * * * *